(12) United States Patent
David (10) Patent No.: US 11,907,854 B2
(45) Date of Patent: Feb. 20, 2024

(54) SYSTEM AND METHOD FOR MIMICKING A NEURAL NETWORK WITHOUT ACCESS TO THE ORIGINAL TRAINING DATASET OR THE TARGET MODEL

(71) Applicant: Nano Dimension Technologies, Ltd., Ness Ziona (IL)

(72) Inventor: Eli David, Tel Aviv (IL)

(73) Assignee: Nano Dimension Technologies, Ltd., Ness Ziona (IL)

( * ) Notice: Subject to any disclaimer, the term of this patent is extended or adjusted under 35 U.S.C. 154(b) by 196 days.

(21) Appl. No.: 16/910,744

(22) Filed: Jun. 24, 2020

(65) Prior Publication Data

US 2020/0320400 A1 Oct. 8, 2020

Related U.S. Application Data

(63) Continuation-in-part of application No. PCT/IL2018/051345, filed on Dec. 10, 2018, which is
(Continued)

(51) Int. Cl.
*G06N 3/086* (2023.01)
*G06N 3/084* (2023.01)
*G06N 3/04* (2023.01)

(52) U.S. Cl.
CPC ............. *G06N 3/086* (2013.01); *G06N 3/04* (2013.01); *G06N 3/084* (2013.01)

(58) Field of Classification Search
CPC .............................................. G06N 3/02–126
(Continued)

(56) References Cited

U.S. PATENT DOCUMENTS 5,265,192 A 11/1993 McCormack
9,721,214 B1 8/2017 Corrado et al.
(Continued)

FOREIGN PATENT DOCUMENTS

WO WO 2004/010282 1/2004

OTHER PUBLICATIONS

Zhang et al. "Privacy-preserving Machine Learning through Data Obfuscation", 2018, arXiv:1807.01860v2.*
(Continued)

*Primary Examiner* — Daniel T Pellett
(74) *Attorney, Agent, or Firm* — PEARL COHEN ZEDEK LATZER BARATZ LLP (57) ABSTRACT

A device, system, and method is provided to mimic a pre-trained target model without access to the pre-trained target model or its original training dataset. A set of random or semi-random input data may be sent to randomly probe the pre-trained target model at a remote device. A set of corresponding output data may be received from the remote device that is generated by applying the pre-trained target model to the set of random or semi-random input data. A random probe training dataset may be generated comprising the set of random or semi-random input data and corresponding output data generated by randomly probing the pre-trained target model. A new model may be trained with the random probe training dataset so that the new model generates substantially the same corresponding output data in response to said input data to mimic the pre-trained target model.

30 Claims, 3 Drawing Sheets

Related U.S. Application Data a continuation of application No. 16/211,994, filed on Dec. 6, 2018, now Pat. No. 10,699,194, application No. 16/910,744 is a continuation-in-part of application No. 16/211,994, filed on Dec. 6, 2018, now Pat. No. 10,699,194.

(60) Provisional application No. 62/679,115, filed on Jun. 1, 2018.

(58) Field of Classification Search
USPC .................................................. 706/12–44
See application file for complete search history.

(56) References Cited

U.S. PATENT DOCUMENTS

| | | | |
|---|---|---|---|
| 2003/0130899 | A1 | 7/2003 | Ferguson et al. |
| 2003/0233335 | A1 | 12/2003 | Mims |
| 2005/0192914 | A1 | 9/2005 | Drege et al. |
| 2011/0064221 | A1* | 3/2011 | McSherry ............... H04K 1/02 380/252 |
| 2013/0132311 | A1 | 5/2013 | Liu et al. |
| 2015/0370251 | A1 | 12/2015 | Siegel et al. |
| 2015/0379072 | A1 | 12/2015 | Dirac et al. |
| 2016/0063393 | A1 | 3/2016 | Ramage et al. |
| 2016/0078339 | A1 | 3/2016 | Li et al. |
| 2016/0300156 | A1 | 10/2016 | Bowers et al. |
| 2017/0083829 | A1 | 3/2017 | Kang et al. |
| 2017/0132528 | A1 | 5/2017 | Aslan et al. |
| 2017/0308324 | A1 | 10/2017 | Courville et al. |
| 2018/0000385 | A1 | 1/2018 | Heaton et al. |
| 2018/0101697 | A1* | 4/2018 | Rane ....................... H04L 9/085 |
| 2018/0157992 | A1 | 6/2018 | Susskind et al. |
| 2018/0268292 | A1 | 9/2018 | Choi et al. |
| 2018/0322417 | A1 | 11/2018 | Bendre et al. |
| 2019/0034764 | A1 | 1/2019 | Oh et al. |
| 2019/0051290 | A1 | 2/2019 | Li et al. |
| 2019/0197406 | A1 | 6/2019 | Darvish Rouhani et al. |
| 2019/0205748 | A1 | 7/2019 | Fukuda et al. |
| 2019/0206090 | A1 | 7/2019 | Ray et al. |
| 2020/0364542 | A1* | 11/2020 | Sun ....................... G06N 3/0454 |
| 2021/0374279 | A1* | 12/2021 | Zheng ................... G06N 5/022 |

OTHER PUBLICATIONS

Correia-Silva et al., "Copycat CNN: Stealing Knowledge by Persuading Confession with Random Non-Labeled Data", IEEE, Jun. 14, 2018, pp. 1-8.

Tramer et al. "Stealing Machine Learning Models via Prediction APIs", 2016, 25th USENIX Security Symposium.

Papernot et al. "Practical Black-Box Attacks against Machine Learning", 2017, Proceedings of the 2017 ACM on Asia Conference on Computer and Communications Security.

Shi et al. "How to Steal a Machine Learning Classifier with Deep Learning" 2017, IEEE.

Shokri et al. "Membership Inference Attacks Against Machine Learning Models", 2017, 2017 IEEE Symposium on Security and Privacy (SP).

Juuti et al. "PRADA: Protecting against DNN Model Stealing Attacks", May 2018, arXiv.org, retrieved from https://arxiv.org/abs/1805.02628v1.

International Search Report and Written Opinion from PCT Appl. No. PCT/IL18/51345 dated Mar. 5, 2019.

* cited by examiner

SYSTEM AND METHOD FOR MIMICKING A NEURAL NETWORK WITHOUT ACCESS TO THE ORIGINAL TRAINING DATASET OR THE TARGET MODEL

CROSS-REFERENCE TO RELATED APPLICATIONS

This application is a continuation-in-part of U.S. patent application Ser. No. 16/211,994 filed on Dec. 6, 2018, to issue as U.S. Pat. No. 10,699,194 on Jun. 30, 2020, which in turn claims the benefit of U.S. Provisional Patent Application 62/679,115 filed Jun. 1, 2018, and is a continuation-in-part of International Patent Application No. PCT/IL2018/051345 filed Dec. 10, 2018, which in turn claims the benefit of U.S. patent application Ser. No. 16/211,994 filed on Dec. 6, 2018 and U.S. Provisional Patent Application 62/679,115 filed Jun. 1, 2018, all of which are incorporated herein by reference in their entirety.

FIELD OF THE INVENTION

Embodiments of the invention relate to the field of artificial intelligence (AI) by machine learning. In particular, embodiments of the invention are related to training a predictive or deep learning model such as a neural network (NN), logistic regression, or Bayesian model.

BACKGROUND OF THE INVENTION

An artificial neural network, or simply "neural network," is a computer model, resembling a biological network of neurons. Neural networks are a family of methods within machine learning, under artificial intelligence. Neural networks typically have a plurality of artificial "neurons" that are connected by artificial "synapses." There are many types of NNs that have various arrangements of neurons including partially or fully connected NNs, recurrent NNs (RNNs), convolutional NNs (CNNs), etc. For example, a connected NN typically has an input later, multiple middle or hidden layer(s), and an output layer, where each layer has a plurality (e.g., 100s to 1000s) of artificial neurons. In a fully-connected NN, each neuron in a layer (N) may be connected by an artificial "synapse" to all neurons in a prior (N−1) layer and subsequent (N+1) layer, whereas in a partially-connected NN only a subset of neurons in adjacent layers are connected.

A NN is trained based on a leaning dataset to solve or learn a weight of each synapse indicating the strength of that connection. The weights of the synapses are generally initialized, e.g., randomly. Training is performed by iteratively inputting a sample or set of samples from the training dataset into the NN, outputting a result of the NN applied to the dataset, calculating errors between the expected (e.g., target) and actual outputs, and adjusting NN weights to minimize errors. Training may be repeated until the error is minimized or converges. Typically, multiple passes (e.g., tens or hundreds) through the training set are performed (e.g., each sample is input into the NN multiple times). Each complete pass over the entire training dataset is referred to as one "epoch".

Training an accurate NN is typically a complex and time-consuming task. A typical training process consists of billions (or trillions) of calculations that may take hours, days or even weeks to complete. So, once produced, other devices or parties may want to replicate an accurately trained NN, instead of developing one from scratch. However, NNs and their training data are often kept secret for data privacy, security, or proprietary reasons. Without access to the secret training dataset, other devices or parties cannot currently replicate a pre-trained NN.

Another limitation of conventional NNs is that new information cannot be added or old information deleted from the NN without retraining based on the entire training dataset. Training based solely on the changed data will override old neural connections and knowledge. Thus, to incorporate new data into the NN, no matter how minor, the training process is re-run from scratch with the original training dataset and the new samples added, which is a time-consuming process. Similarly, undesirable training data cannot be eliminated from the NN without completely retraining the NN based on the entire revised training dataset. In fact, any modification that re-trains the NN requires retraining over the entire training dataset. Thus, the NN cannot be modified or improved by devices or parties that do not have access to the original training dataset.

Accordingly, there is a need in the art to provide a mechanism to mimic and/or modify a NN without access to its secret original training dataset.

SUMMARY OF THE INVENTION

Embodiments of the invention provide a device, system and method for training a new ("student") neural network to mimic a pre-trained target ("mentor") neural network without access to the target model (e.g., neural network) itself (a "black box" model) or to the original training dataset used to generate the target model (secret training data).

According to some embodiments of the invention, there is provided a device, system and method for mimicking a pre-trained target model at a device without access to the pre-trained target model or its original training dataset. A set of random or semi-random input data may be sent from the local device to a remote device to randomly probe the pre-trained target model remotely by inputting the set of random or semi-random input data into the pre-trained target model. A set of corresponding output data may be received from the remote device generated by the remote device applying the pre-trained target model to the set of random or semi-random input data. A random probe training dataset may be generated comprising the set of random or semi-random input data and corresponding output data generated by randomly probing the pre-trained target model. A new model may be trained with the random probe training dataset so that the new model generates substantially the same corresponding output data in response to said input data to mimic the pre-trained target model. According to some embodiments, a correlation in the new model may be removed or diluted based on training data linking an input to an output, without accessing one of the input or output, by adding to the training dataset a plurality of random correlations to the output or input, respectively, to weaken or eliminate the correlation between the input and output.

BRIEF DESCRIPTION OF THE FIGURES

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

According to some embodiments of the invention, there is now provided a device, system, and method for mimicking, replicating, or reverse engineering, a pre-trained target model without access to the model itself (a "black box" model) and without access to the original training data used to generate that model (secret training data). This may be achieved by probing the target "black box" model with random or semi-random input data and recording its corresponding outputs, to learn the target model's behavior. This random probe dataset or "junk" data (e.g., pairs of random or semi-random inputs and their corresponding model outputs) may be used as a training dataset to train a new model to mimic the target model. By learning how the target black-box model behaves with random or "junk" data, the new model may be trained to behave substantially the same as the target model, without ever accessing the original training dataset that caused it to behave as such. Accordingly, the new model may replicate the target model without sacrificing the secrecy of the target model's original training dataset.

For example, a target or "mentor" model may be pre-trained for autonomous vehicle driving, drone navigation, facial recognition, text recognition, or any other deep learning application. Embodiments of the invention may probe the mentor model with random or semi-random sensor, image, and/or other input data and collecting the corresponding outputs from the mentor model. This probing process may repeat over many (e.g., millions) of iterations to generate a new random probe dataset of pairs of random input and corresponding output from the mentor model. This random probe dataset may be used to train a new or "student" model. Training the student model to match how the mentor model behaves when probed with random or junk data causes the student model to e.g. asymptotically approach the mentor model. Training may complete when the student model substantially matches the output of the mentor model, e.g., yielding the same predictions for an above threshold proportion (e.g., >98%) of test inputs.

In some embodiments, the pre-trained target model may be represented as a transformation or map of data from an X-dimensional input space to a Y-dimensional output space. In one example, for recognizing numbers in images, the input data may be images of size 100×100 pixels in a 10000 dimensional input space, and the output data may be 10 digits in a 10 dimensional output space. Therefore, the target model is a transformation from a 10000 dimensional data point to a 10 dimensional space data point (although the target transformation may map data from any X-dimensional space to any Y-dimensional space). The original training dataset includes pairs of input and corresponding output data (X-dimensional vector or point, Y-dimensional vector or point) used to train that transformation. With no access to this original training dataset, embodiments of the invention may randomly or semi-randomly select points in the X-dimensional space (e.g., according to a constant, Gaussian, or other distribution in the X-space) to input into the pre-trained target model, and receive the corresponding Y-dimensional outputs (e.g., the target transformation of those respective inputs). The set of pairs of random X-dimensional inputs and corresponding Y-dimensional outputs may form a new random probe training dataset, which may be used to train a new transformation to map data in the same way as the target transformation. Although the random probe training dataset has a different distribution of points in the X and Y-dimensional spaces than the original training dataset, the points are transformed according to the same target transformation, and so will train a new model transformation that maps data in substantially the same manner as the target model transformation.

The random probe dataset may be either fully-random or semi-random. A fully random dataset may be selected entirely at random (e.g., a random distribution of points in an input X-dimensional space) and not set to a particular type or specific data. Fully-random probing may wildly span the input space, providing both relevant and irrelevant input data. The closer the random probe dataset is to the original training dataset, the better the new model will typically match the pre-trained target model and the faster the training period. Accordingly, to increase speed, efficiency and accuracy, instead of training the new model with a fully random probe dataset, some embodiments of the invention may use a semi-random probe dataset that is as similar as possible to (but different than) the original training dataset.

A partially or semi-random training dataset may be selected randomly, but with a preference among samples, based on some knowledge of the model or training dataset, such as the type or purpose of the model. For example, if the purpose of the model is to identify faces in images, the training dataset may be narrowed to images of faces. In another embodiment, the semi-random training dataset may include a portion of data from the training dataset (e.g., a 10% "public" or "non-secret" subset of the original training dataset, but not the remaining 90% designated as "confidential" or "secret") that may be supplemented with random data. In another embodiment, semi-random data may include unlabeled or untagged data (e.g., an image dataset with no knowledge via labels of what type of images are in the dataset).

Some embodiments may learn information about the original training dataset by performing statistical analysis to measure properties (e.g., color, contrast, standard deviations, local correlations, etc.) of a portion of the original training data (if available) or of data of the same type as the original training dataset (e.g., images of faces). Statistical analysis may be performed on a relatively small sample of data (e.g., 0.1-10% of the size of the original or new training dataset). The result of the statistical analysis may be a non-uniform distribution of the input space similar to that of the original training dataset. This distribution may be used to select the random probe training dataset according to the same non-uniform distribution to better match the original training set. In various embodiments, these statistics may be run on random data of the same type as the original training data, or on a portion of the original training dataset (e.g., 1% of original training dataset, if available), or on a hybrid combination of the actual portion of the original training dataset and a portion of samples synthesized therefrom (e.g., 50% original training samples and 50% randomly generated samples).

The new training data may be tuned to more closely match or converge to the original training data (e.g., having an input space distribution that more closely resembles that of the original training data, e.g., compared to a uniform input space distribution). In one embodiment, where the type or distribution of training data is unknown (not clear if it is image, text, or audio data, or if the distribution of data in the input space is gaussian or constant), the target model may be probed to discern the type or distribution of training data. Ideally, minor adjustments in samples of the correct type or distribution (same as or substantially similar to the training dataset) will typically result in small changes to the model output (stable model), whereas minor adjustments in samples of the incorrect type or distribution may result in relatively large changes to the model output (unstable model). Accordingly, some embodiments may probe the model with multiple slightly different samples, e.g., varied according to a gaussian, uniform, or other distributions and/or for each of a plurality of different data types. The data type and/or distribution for which the model is most stable (e.g., where relatively small changes in the input space cause relatively small changes in the output space) may be used as the data type and/or distribution to select the new training data. This mechanism may be performed in an initial test probe of the target model, e.g., prior to training the new model. Additionally or alternatively, this mechanism may be performed on-the-fly while training the new model. For example, the training data may be automatically adjusted to incrementally improve model stability in each subsequent epoch based on the results from one or more earlier epochs.

In one embodiment, training error may be computed in the final output layer (e.g., based on the expected values of a training dataset compared to the calculated values) on-the-fly during training the new model. Training error may be measured as a "first-order" error (i.e., based on the first derivative of the error), such as "gradient descent" optimization including "backpropagation," a "second-order" error (i.e., second derivative), such as "Hessian-Free Optimization," a higher-order error, or another method such as "contrastive-divergence" based on mathematical principles. In some embodiments, the training dataset (e.g., in a subsequent epoch) may be automatically adjusted on-the-fly to converge to training data that effects a lowest or lower error (e.g., in a current or past epoch).

In another embodiment, this training error computed at the final output layer, may be propagated backwards through the neural network back to the input layer, to update the input sample itself in a manner that reduces the error. By iterating over this backpropagation process multiple times, the input samples themselves are modified. For example, in the application of autonomous driving, a mentor model that classifies obstacles to avoid collisions may be fed with a random or semi-random input, and the model may activate a neuron corresponding to "obstacle" at the output layer. Then, the error between the actual output in the training dataset and the expected output predicted by the model may be calculated. This error may be backpropagated through the neural network of the target model, and the input data may be updated to minimize this error. After multiple iterations, the input sample gradually converges to fully activate the output neuron "obstacle." Thus, the updated sample is an artificially generated sample that the neural net classifies as a perfect obstacle. This process may be repeated to generate as many synthetic training samples as desired, thus creating an entire dataset of synthetic samples. In one embodiment, each synthetic sample may activate a different neuron at the output layer of the mentor model (e.g., an obstacle neuron, a road sign neuron, a lane boundary neuron, etc.).

In one embodiment, in which the target neural network model itself is accessible or its parameters known (e.g., the number N of layers in the model, the number, type and/or properties of neurons in each layer, etc.), the layers may be trained and/or the training error may be computed in a layer-by-layer manner. For example, given a target model with N layers, and each layer having $X_i$ neurons (index i between 1 and N), a new network may be trained in a plurality of stages in which each stage trains a sequential layer, one layer at a time. In a first stage, the new network may be trained to mimic the output of the $X_1$ neurons in the 1st layer of the target network. After the 1st layer is trained, its values are fixed or frozen, and the process proceeds to train the next subsequent layer. Thereafter, in a second stage, with the prior first layer fixed, the new network may be trained to mimic the output of the $X_2$ neurons in the 2nd layer of the target network. In general, in each jth stage, the prior trained j−1 layers are fixed, and used to train the subsequent jth layer of the new network. This process may continue, layer-by-layer, until the final sequential Nth output layer is trained. Training the model layer-by-layer typically improves the accuracy and speed of training as compared to simultaneously training all layers in the model. The accuracy of the new network increases in the layer-by-layer approach because it incorporates additional intermediate transformations (e.g., mimicking one layer at a time) of the target network that are not generated in the full model training approach (which tries to mimic the output directly given an input, and has no insight into the N transformations that the data undergoes within the N layers of the mentor model).

The speed of training the new network increases in the layer-by-layer approach because the cumulative computations for training one layer at a time (e.g., N−1 adjacent-layer transformations from layer i to layer i+1, i=1, N) are significantly simpler and less time-consuming than computations for training the entire model at once (e.g., transformation from input space X, across N layers, to output space Y). The layer-by-layer training method may progress, either in a "forward" direction, training from the 1st to the Nth layer (e.g., 1, 2, . . ., N layers), or in the "reverse" direction, training from the Nth to the 1st layer (e.g., N, N−1, N−2, . . ., 1 layers).

The training process may repeat for multiple epochs. Whereas conventional training reiterates over each epoch using the same training dataset, according to embodiments of the invention, because the training dataset is random, a different random probe dataset may be used during a plurality of (e.g., two or more, up to all) training epochs. Using different probe datasets may increase the diversity of training data, which typically increases the accuracy with which the new model mimics the target model in the same amount of training time or yields a similar accuracy in a faster training time.

Embodiments of the invention may test the similarity between the new and pre-trained target models based on the random probe dataset or by probing both models with a new random or semi-random set of test inputs to determine the similarity between the corresponding outputs generated by the new and target models. Training may terminate after a measure of such similarity exceeds a threshold or after a predetermined number of epochs. A predetermined number of input/output training pairs, distribution of training pairs, number or diversity or epochs, may result in a sufficient or above threshold match (or lower than threshold error or distance) between the new and target models (e.g., when probed with random test data).

Figure 1:
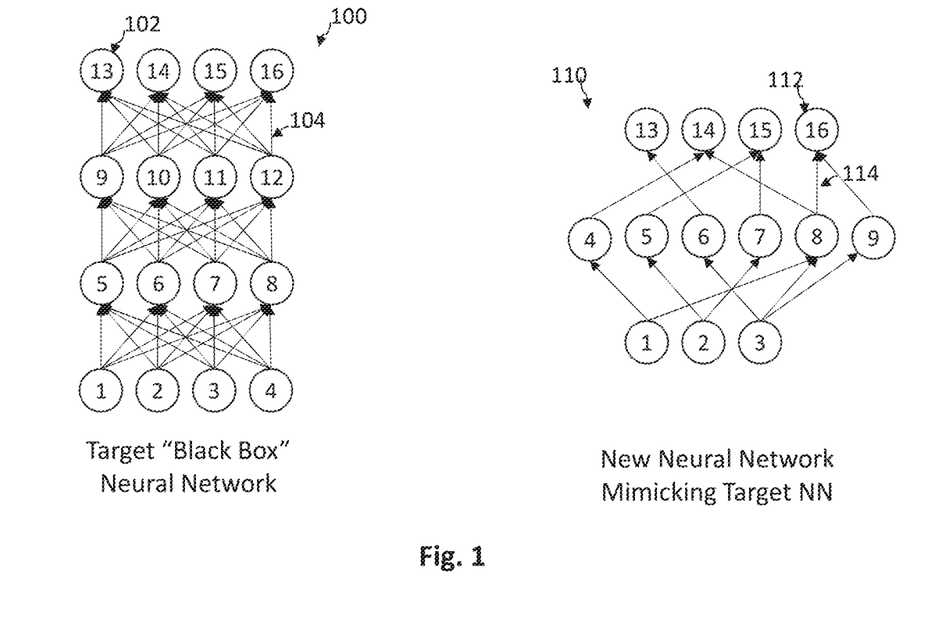
FIG. 1 is a schematic illustration of an example target "black box" neural network and a new neural network trained to mimic the target neural network in accordance with some embodiments of the invention.

Whereas the new model behaves substantially the same as the target model, it may have a different structure. For example, if the models are NNs, they may have different architectures (e.g., fully connected, partially connected, RNN, CNN, etc.), different numbers of neurons, different numbers of layers, different connection types, etc. (e.g., as shown in FIG. 1). While in some embodiments this may be an unintentional consequence of not knowing the structure of the target model, in other embodiments this may be an intentional way to reorganize the target model to a simpler structure. For example, if a target NN has a relatively complex structure (e.g., a greater than threshold number of neurons, layers or connections or a relatively complex neuron connection type, such as fully-connected), embodiments of the invention may generate a new model with a relatively simple structure (e.g., set to have a lower than threshold number of neurons, layers or connections or a relatively simple neuron connection type, such as partially-connected) that behaves in the same way to replace the complex target model. Simplifying the structure of the model (e.g., reducing the number of neurons, layers and/or connections) may reduce the size and memory space used to store the model and increase the processing speed (less time required for prediction).

In some embodiments, it may be desirable to add new knowledge, or remove existing knowledge, from the already trained neural network. For example, as new training data becomes available or the model is expanded to address a new class of prediction, it may be desirable to add new data to the training dataset. Conversely, if old data is deemed sensitive or obsolete, this data should be eliminated from the training dataset, and the knowledge unlearned from the network. However, conventional models cannot simply be re-trained by training only on the new data or deleting old data, because such training would override accurate connections from the initial training, thereby deleting desirable prior knowledge. The only conventional way to incorporate new data or eliminate old data in conventional models is to obtain the original training dataset, add or delete the data to/from the original training dataset, and re-start the entire training process from scratch with the modified training dataset. However, when a third party wants to modify another's model, the third party may not be able to access the original training dataset.

According to some embodiments of the invention, there is now provided a device, system, and method to incorporate new training data or eliminate a partial subset of the original training dataset in a pre-trained target model without accessing the original training dataset. This may be achieved, instead of modifying the inaccessible original training dataset, by modifying the random probe dataset. Thus, the new training dataset may comprise random or junk data (e.g., acting as a stabilizer to maintain prior knowledge) plus or minus the added or deleted data, respectively (e.g., acting as a modifier to add new knowledge or forget old knowledge). Because the random probe data acts as a placeholder for the original training dataset, adding or deleting data therefrom will effect substantially the same change in the model as if the data were added or deleted to/from the original training dataset. Thus, the target model may be modified or improved without ever accessing the original training dataset.

According to some embodiments of the invention, there is now provided a device, system, and method to eliminate pre-existing knowledge of inputs, outputs and/or correlations therebetween, without access to that knowledge, and thus, without the ability to directly delete those pre-existing inputs, outputs and/or correlations. This may be achieved by diluting or obfuscating pre-existing unknown input/output correlations with random correlations, intentionally creating confusion in the NN, trained to render the old correlations ineffective. Such embodiments of the invention do not directly delete training data (which cannot be directly deleted because it is unknown), but adds random input/output correlations to the training dataset to obfuscate its training, weakening its true predictive correlation with false random correlations (misdirecting or confusing the NN), until the original training of that data is so diluted that it is indecipherable. The base training dataset may the random probe training dataset (mimicking a secret training dataset) or an otherwise secret training dataset. In one example, a company may want to remove secret records of people's faces, but cannot simply delete those picture because it does not have access to that secret data. Instead, embodiments of the invention create false input/output correlations linking the person's identity to pictures of random faces. For example, training the face recognition NN to link a person's identity to 1,000 pictures of random faces will dilute and render ineffective the link of the person's identity to the picture of the person's true face, without ever knowing or obtaining the true picture or identity-picture correlation. Thus, embodiments of the invention train NNs to eliminate input/output correlations without ever accessing that data itself.

Additionally or alternatively, pre-existing knowledge of inputs, outputs and/or correlations therebetween may be eliminated, without access to that knowledge, by eliminating a category or class in the pre-trained target model. Conventional models delete training pairs of input and output. For example, conventional facial recognition models delete an image of a face correlated to an identity e.g. "Brian". In contrast, according to embodiments of the invention, there is no access to input image of the face. Accordingly, embodiments of the invention may delete a category or classification of prediction (e.g., remove "Brian" or "Name" in general). Because training inputs in the random probe dataset are randomly generated, these unlinked inputs will cancel out or diminish to have no average or reduced overall effect. In contrast, if one were to delete a class or category (e.g., "Brian") in conventional models, and still have the input (e.g., a picture of Brian), the specific input may be rerouted to another identify, which causes false data that generates an inaccurate model. Accordingly, eliminating a category or class in a random probe dataset leads to more accurate NN training than eliminating a category or class in a standard training dataset.

The same principle can be used for any re-training or post-processing of an already trained target model without ever accessing the original training dataset. Instead of re-training the target model (which requires the secret original target dataset), embodiments of the invention may retrain the new model that mimics the target model using the random probe dataset (without exposing the secret original training dataset). Such re-training may include, for example, sparsifying the model by deleting or pruning weak neuron connections to decrease the model size (e.g., as described in U.S. patent application Ser. No. 16/041,497, which is incorporated herein by reference in its entirety) or evolving the model using a genetic algorithm to improve the model search space and accuracy (e.g., as described in U.S. patent application Ser. No. 16/121,015, which is incorporated herein by reference in its entirety, or any other re-training method for example that lowers memory usage and size (creates a smaller neural network), increases processing speed, or increases the accuracy of the neural network.

Models described herein may have any structure, including, but not limited to any type of neural networks (e.g., including fully connected as shown in FIG. 1, partially connected, RNN, CNN, etc.), logistic regression, Bayesian models, decision trees, random forest models, evolutionary algorithms (e.g., genetic algorithms, genetic programming, or evolution strategies), support vector machines (SVM), or any other type of machine learning model that, if given an input X, can learn to predict an output Y.

Embodiments of the invention provide several significant improvements:

Because embodiments of the invention can mimic and modify a target model without accessing the original training dataset, only the target model itself, but not the original training dataset, needs be stored. Thus, after a target model is generated, the original training dataset may be deleted, resulting in a significant reduction in memory space (e.g., a reduction of gigabytes, terabytes, or in applications such as video analysis, petabytes, used to store a training dataset). Nothing significant is lost by deleting the original training dataset because embodiments of the invention can generate a random probe dataset on-the-fly to replace the original training dataset, thereby preserving the ability to reproduce or modify the target model. Additionally or alternatively, some embodiments may delete (not store) the random probe dataset from memory. In some embodiments, when training the new model, there is no need to store the random probe training dataset because its data is randomly generated and therefore equivalent to or replaceable by any other random selection. By not storing the training dataset, the new model may be trained using a minimal amount of memory space. For example, a memory may temporarily store only a single training sample or less than a predetermined maximum number of training sample(s) (e.g., to fill a buffer or temporary memory) at a time. The system may delete the sample on-the-fly, for example, after the sample is used for training or when a new training sample is added to the memory to replace the least recently used sample in the buffer memory. Because embodiments of the invention can train the new model by only storing the training data being currently used (not storing the entire training dataset), training can be executed by devices with relatively small memory space (e.g., storing as little as megabytes of data), such as, mobile devices, drones, etc. (e.g., devices 214 of FIG. 2).

Another benefit of not needing to share or store the original training dataset is data security. For example, a first device (e.g., 202 of FIG. 2) may allow a second device (e.g., 214 of FIG. 2) to replicate its target model without ever transmitting, sharing or exposing its original training dataset to the second device. In some embodiments, the first device permanently deletes the only copy of the original training dataset after training the target model. This permanent deletion is possible because embodiments of the invention provide means to mimic, modify, and re-train the model without the original training dataset by using placeholder random probe data. Permanently deleting the training dataset provides absolute security because the data can never be recovered or exposed.

Another benefit of embodiments of the invention is that, whereas conventional training uses the same training data for all epochs, because the random probe data is randomly generated and, on average, as effective as any other random selection, training may use different random probe data for different training epochs. This diversity in training data may lead to faster training compared to conventional training using the same dataset in every epoch, thereby increasing the speed of training the model.

Another benefit of embodiments of the invention is that the new model may be constructed to have any desirable structure (e.g., NN architecture, number of NN layers, number of neurons, NN connection type, etc.) different than the structure of the target model. The structure of the new model may be selected to be simpler than that of the target model (if known) and/or result in a file size that is less than a predetermined value or the file size of the target model (if known). For example, the new model may be designed to have a fewer number of layers, a fewer number of neurons, or a simpler connection-type (e.g., partially-connected vs. fully-connected) than the target model. Thus, while the new model behaves just like the target model, the new model may have a smaller file size, occupying less memory space to store the new model, and a simpler model structure resulting in faster processing speeds to run the new model, relative to the target model. Further, because embodiments of the invention support re-training the new model, the new model may use a sparsification method during the process mimicking the target model, thus eliminating or pruning weak or negligible neuron connections to decrease the model size. Sparsification results in a linear speed-up on any hardware. For example, a 90% sparse neural network results in a 10 times speed-up in comparison to a non-sparse network.

Another benefit of embodiments of the invention is that pre-existing knowledge may be deleted, without access to that knowledge, by diluting old connections with random data. In conventional systems, if a NN has prohibited data, the entire NN cannot be used and the training data cannot be shared as both risk revealing the prohibited data. Accordingly to embodiments of the invention, prohibited data may be eliminated, either by diluting it with random data to render it ineffective, or by eliminating a category or class associated with the prohibited data in the random probe dataset. Such embodiments allow users to use otherwise prohibited NN and training datasets. Further, whereas eliminating a class or category in a conventional training dataset causes the preserved inputs or outputs to be rerouted to false data to create inaccurate NNs, the probe training dataset is randomly generated accordingly to embodiments of the invention so training the preserved inputs or outputs averages out to reduce or eliminate false connections, thereby improving NN accuracy.

Reference is made to FIG. 1, which schematically illustrates an example unknown or "black box" target neural network 100 and a new neural network 110 that mimics or substantially replicates the predictive behavior of the target neural network 100 in accordance with some embodiments of the invention. Although the target neural network 100 of FIG. 1 is shown as a fully-connected NN, this is merely an example NN, and any other NN structure or type may equivalently be used according to embodiments of the invention, including, but not limited to, partially connected NNs, RNNs, CNNs, etc.

Target neural network 100 includes a plurality of artificial neurons 102. Artificial neurons 102 may be arranged in a hierarchy of multiple layers. Neural network 100 may include an input layer (neurons 1-4), one or more middle or hidden layer(s) (neurons 5-12), and an output layer (neurons 13-16). Each neuron 102 in each layer is connected by an artificial synapse connection 104 to some neurons (partially-connected) or all neurons (fully-connected) in an adjacent layer. Neurons (1-4) in the input layer are connected to neurons in the subsequent higher layer, neurons (5-12) in the middle layers are each connected to neurons in both the previous and subsequent layers, and neurons (13-16) in the output layer are connected to neurons in the previous lower layer. Target neural network 100 may be represented by a plurality of weights representing the strengths of the respective plurality of synapse connections 104. The structure of target neural network 100 is only an example, and any other arrangement of neurons, synapses, layers, or connection types may be used.

A local device (e.g., 214 of FIG. 2) cannot directly copy or retrain target neural network 100 using conventional methods because the target neural network 100 itself as well as the original training dataset used to train target neural network 100 are inaccessible to the local device. For example, target neural network 100 may be stored at a remote location (e.g., stored exclusively at one or more remote databases or servers 202 of FIG. 2) where it is kept secret from the local device. Likewise, the original training dataset may also be stored at the same or different remote location (e.g., stored exclusively at one or more remote databases or servers 202 of FIG. 2) where it is kept secret from the local device, or the original training dataset may be permanently deleted after training is complete. In some embodiments, the only access the local device has to the target neural network 100 is through the remote device. The local device may request that the remote device randomly probe the target neural network 100 by sending the remote device a set of random or semi-random inputs. The remote device may run those inputs through the model and return to the local device a set of corresponding data output by the target neural network 100. The local device may generate a new training dataset comprising the corresponding pairs of said inputs and outputs generated by randomly probing the target neural network 100. The local device may then train the new neural network 110 with the new training dataset so that the new model generates substantially the same corresponding outputs to said inputs to mimic the target neural network 100.

After training, the new neural network 110 may ideally have the same exact set of output neurons (13-16) in the output layer as the target neural network 100 (though in practice, one or a small number of output neurons in the target neural network 100 may be missing from the new neural network 110). The input layer and middle layer(s), on the other hand, may be the same or different between the new and target neural networks 100 and 110. In some embodiments, the purpose of generating the new neural network 110 is to create a NN that has the same predictive behavior as the target neural network 100, but with simpler model structure (e.g., smaller file size, fewer neurons or layers, simpler connection type, etc.). In those cases, the new neural network 110 may be designed to have fewer neurons, synapses, or middle layers, or a simpler connection type, than target neural network 100.

By training the new neural network 110 to mimic the pre-trained target neural network 100 without access to its original training data, embodiment of the invention may allow multiple parties or devices to share and reuse NNs without sacrificing the security or privacy of the original training data. Such embodiments also allow other parties or devices to improve one party or device's NN (e.g., sparsifying or evolving the NN) by mimicking the re-training or second pass training of the target NN, without accessing the original training data, thereby bolstering security and data privacy. These benefits to data privacy are particularly important in environments that require data secrecy, such as, medical applications. In addition, such embodiments support adding new training data or deleting old training data from the NN without accessing the original training data by adding or deleting the data to/from the random probe training dataset. Further, some embodiments allow the model to be modified to add a new or delete an old category or classification of prediction without accessing the original training data. This allows new knowledge to be added and old knowledge to be deleted without overriding the remaining data (preserving synapse connections and weights attributed to the old preserved data). By using random probe training data as a placeholder for the original training data, embodiments of the invention allow replicating or re-training the NN after the original training data is deleted, thereby bolstering security by not storing private data and reducing memory storage.

Figure 2:
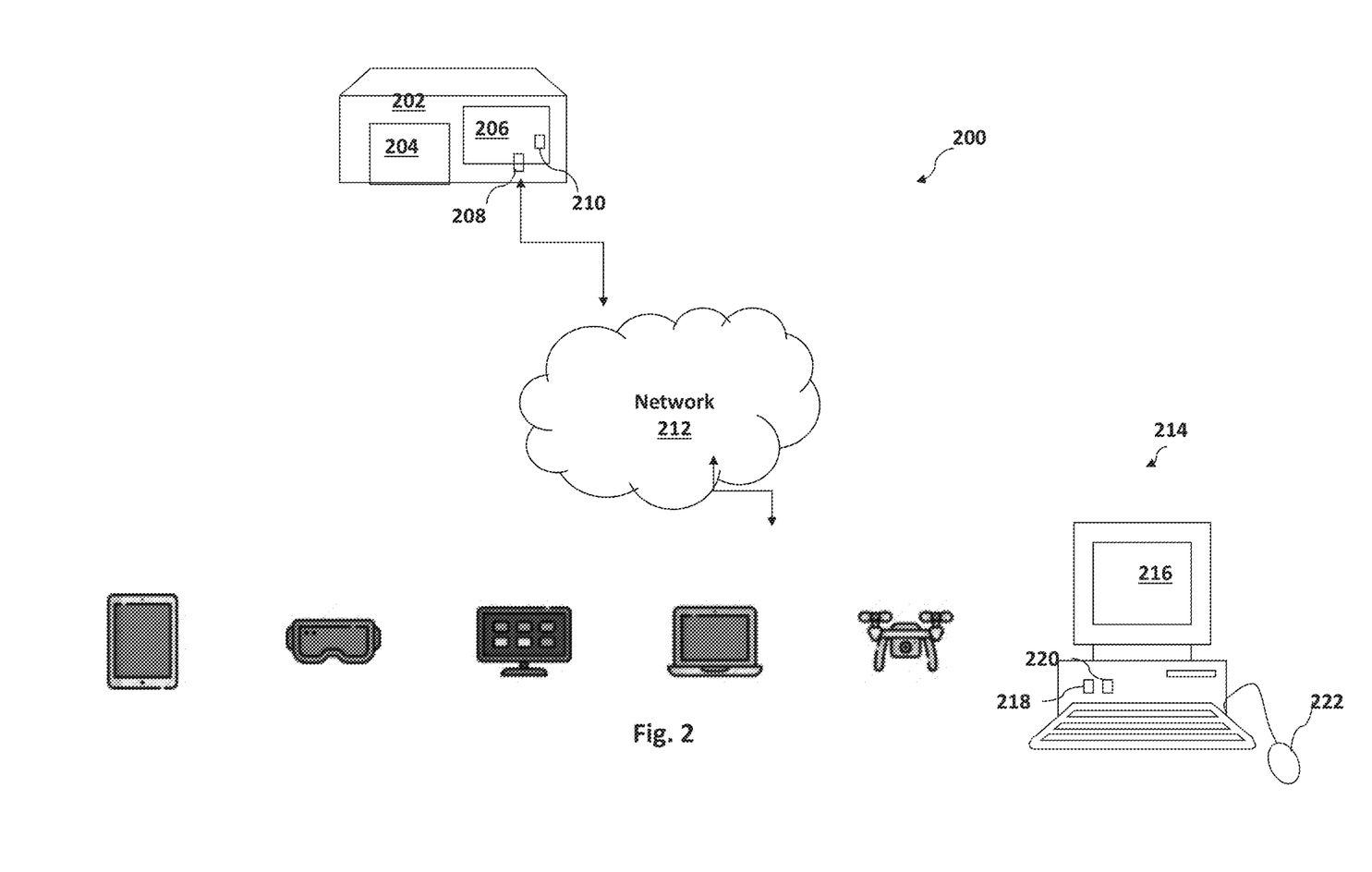
FIG. 2 is a schematic illustration of a system for training a new model to mimic a target model in accordance with some embodiments of the invention.

Reference is made to FIG. 2, which schematically illustrates an example system for training a new model to mimic a target model in accordance with some embodiments of the invention. System 200 may store and/or generate the data structures and implement the training and prediction of models described in reference to FIGS. 1 and 3.

System 200 may include one or more local endpoint device(s) 214 and one or more remote server(s) 202 accessible to the local device via a network 212 or computing cloud. Remote server 202 may provide a cloud-based model prediction service for local endpoint device(s) 214. Remote server 202 may train, store and/or run a target model neural network (e.g., target neural network 100 of FIG. 1). Local endpoint device(s) 214 may send remote server 202 requests to make model predictions for a set of one or more inputs. Remote server 202 may run those inputs through the target model to generate corresponding outputs, and send those outputs to the local endpoint device(s) 214. While remote server 202 provides the results of the target model, it does not expose or share the target model data itself or the original training dataset used to train the target model with local endpoint device(s) 214.

Remote server 202 may have a memory 206 for storing target model 208 and optionally its original training dataset 210 and a processor 204 for training and/or predicting based on the target model. In various embodiments, the original training dataset may be stored in remote server memory 210, in an external database or memory, or may be permanently deleted (not stored). Memory 206 may also store data including code (e.g., software code) or logic, e.g., to enable storage and retrieval of data 208 or 210 according to embodiments of the invention. In some embodiments, remote server 202 may include, or be operably connected to, specialized hardware including a large memory 206 for storing the target model and/or training dataset and a specialized processor 204 (e.g., a GPU) for training the target model.

Local endpoint device(s) 214 may each include one or more memories 220 for storing a random probe data comprising pairs of random or semi-random inputs and their corresponding target model outputs received from remote server 202. Local endpoint device(s) 214 may use the random probe dataset to train a new model to mimic the target model. In various embodiments, memory 220 may store the entire random probe dataset used to train the new model at once, or may incrementally store on-the-fly each single or set of multiple training samples used in the current iteration or epoch, after which the subset is deleted (e.g., by active deletion or replacing the least recently used sample by a new sample).

Local endpoint device(s) 214 may include smart devices, virtual reality devices, drones, personal computers, desktop computers, mobile computers, laptop computers, and/or notebook computers or any other suitable device such as a cellular telephone, personal digital assistant (PDA), video game console, etc., and may include wired or wireless connections or modems. Local endpoint device(s) 214 may include a randomization engine for generating fully or semi-random input data for probing the target model. Local endpoint device(s) 214 may include one or more input device(s) 222 for receiving input from a user (e.g., neural network parameters, such as, numbers, sizes, dimensions and configurations of neurons, synapses, and layers, accuracy or training thresholds, etc.). Local endpoint device(s) 214 may include one or more output device(s) 216 (e.g., a monitor or screen) for displaying data to a user generated by device 214 or 202. In various applications, local endpoint device(s) 214 is part of a system for image recognition, computer vision, virtual or augmented reality, speech recognition, text understanding, wireless network beamforming patterns, or other applications of artificial intelligence and deep learning. In the application of facial recognition, a device may mimic a target model to efficiently perform facial recognition to trigger the device to unlock itself or a physical door when a match is detected. In the application of security, a security camera system may mimic a target model to efficiently detect a security breach and sound an alarm or other security measure. In the application of autonomous driving, a vehicle computer may mimic a target model to control driving operations, e.g., to steer away to avoid a detected object.

Network 212, which connects local endpoint device(s) 214 and remote server 202, may be any public or private network such as the Internet. Access to network 212 may be through wire line, terrestrial wireless, satellite or other systems well known in the art.

Local endpoint device(s) 214 and remote server 202 may include one or more controller(s) or processor(s) 204 and 218, respectively, for executing operations according to embodiments of the invention and one or more memory unit(s) 206 and 220, respectively, for storing data and/or instructions (e.g., software for applying methods according to embodiments of the invention) executable by the processor(s). Processor(s) 204 and 218 may include, for example, a central processing unit (CPU), a graphical processing unit (GPU, a field-programmable gate array (FPGA), an application-specific integrated circuit (ASIC), a digital signal processor (DSP), a microprocessor, a controller, a chip, a microchip, an integrated circuit (IC), or any other suitable multi-purpose or specific processor or controller. Memory unit(s) 206 and 220 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

Other devices and configurations may be used.

Figure 3:
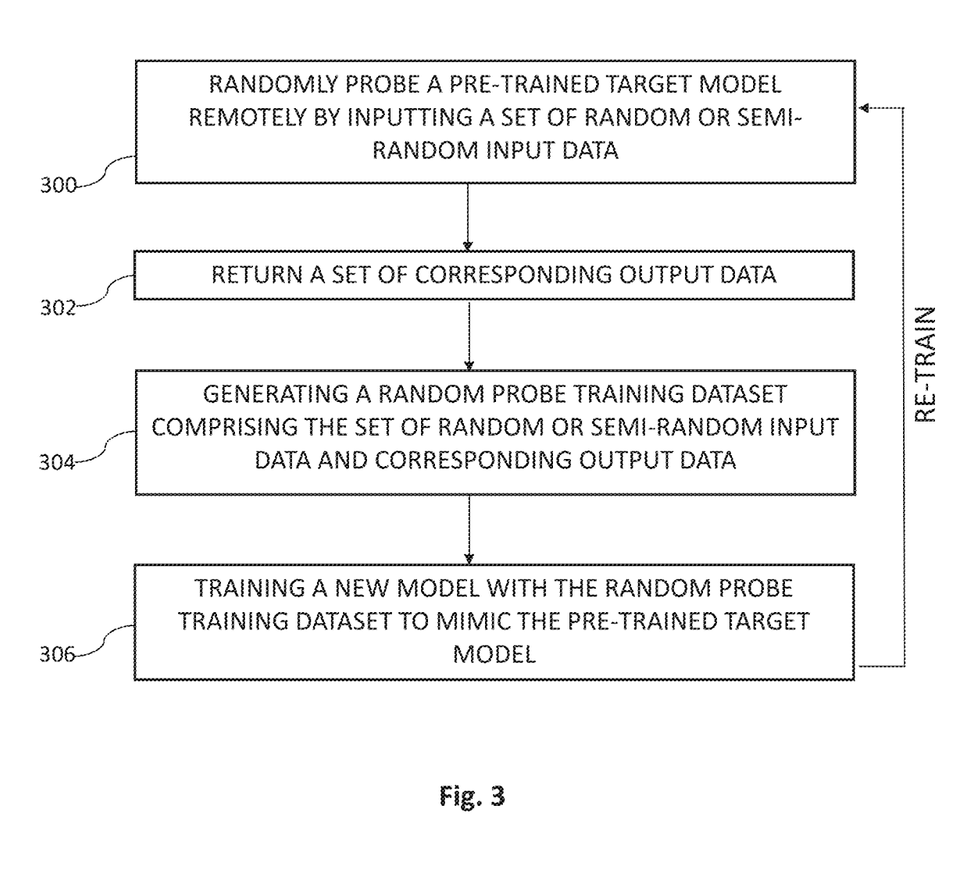
FIG. 3 is a flowchart of a method for training a new model to mimic a target model in accordance with some embodiments of the invention.

Reference is made to FIG. 3, which is a flowchart of an example method for training a new neural network (e.g., 110 of FIG. 1) to mimic a target neural network (e.g., 100 of FIG. 1) in accordance with some embodiments of the invention. The operations of FIG. 3 may be executed by a processor (e.g., one or more processor(s) 218 of FIG. 2) using data stored in a memory (e.g., one or more memory unit(s) 220 of FIG. 2).

In operation 300, a processor (e.g., at a local device 214 of FIG. 2) may send a set of random or semi-random input data to a remote device (e.g., 202 of FIG. 2) to randomly probe the pre-trained target model remotely by inputting the set of random or semi-random input data into the pre-trained target model.

In operation 302, the processor may receive from the remote device a set of corresponding output data generated by applying the pre-trained target model to the set of random or semi-random input data.

In operation 304, the processor may generate a random probe training dataset comprising the set of random or semi-random input data and corresponding output data generated by randomly probing the pre-trained target model.

In operation 306, the processor may train a new model with the random probe training dataset so that the new model generates substantially the same corresponding output data in response to said input data to mimic the behavior of the pre-trained target model. The processor may train the new model over multiple epochs with a different new training dataset in each of the multiple epochs, or may use the same training dataset in each epoch.

After training the new model in operation 306, the new model may be further retrained by repeating the process of FIG. 3 for one or more additional iterations to mimic re-training the target pre-trained model. Retraining may include sparsifying the new model to mimic the pre-trained target mode, evolving the new model by applying evolutionary algorithms to mimic the pre-trained target model, setting the structure of the new model to be simpler than the structure of the pre-trained target model, setting the new model that is a neural network to have a number of neurons, synapses, or layers, to be less than that of the pre-trained target model, setting the new model that is a neural network to have a neuron connection type to be simpler than that of the pre-trained target model, or any other type of retraining.

In some embodiments, the initial training or retraining may include adding new data to the random probe training dataset to incorporate new knowledge not present in the pre-trained target model. In some embodiments, the initial training or retraining may include defining data to be omitted from the random probe training dataset to eliminate knowledge present in the pre-trained target model.

In some embodiments, the processor may test a measure of similarity between the new model and the pre-trained target model by probing both models with a new random or semi-random set of inputs to measure the similarity between their corresponding outputs. An above threshold or asymptotically levelling measure of error may trigger the training process to end.

In some embodiments, because the original training dataset is not needed for the initial training or retraining, the processor at the local device may generate the new model or re-training the new model after all (or some) copies of the original training dataset are deleted at the remote device (or from all locations across the system), for example, significantly reducing storage occupied at the remote device. In some embodiments, the local device may only store a subset of samples of the random probe training dataset being currently or recently used in operation 306 for training on-the-fly in a temporary memory and delete the samples on-the-fly during operation 306 from the temporary memory after the samples are used to train the new model. This may significantly minimize the storage space used by the random probe training dataset.

In one example, the processor may obtain or generate semi-random data by measuring statistical properties of one or more sample inputs of the same type as the original training dataset or an accessible subset thereof and semi-randomly select the set of input data according to those statistical properties. In another example, the processor may obtain or generate semi-random data by requesting the remote device perform an initial probe of the pre-trained target model with multiple input samples of each of a plurality of data types or distributions that are slightly different from each other in an input space, and select the data type or distribution for the random probe training dataset associated with corresponding multiple target model outputs with the smallest difference in the output space. The initial probe may be performed prior to training the new model in operation 306. Alternatively or additionally, the initial probe may be performed on-the-fly during or concurrently with training the new model in operation 306. In some embodiments, training during a previous epoch is used as the initial probe to select the random probe training dataset used to train in the subsequent epoch.

In operation 308, after training the new model, the processor may execute the new model in a run-time phase by inputting new data into the new model and generating corresponding data output by the new model.

The model may be trained and run for various applications, including for example, navigating a drone based on the output of the new model.

Other operations or orders of operations may be used.

Such embodiments provide a device, system and method to replicate, add knowledge to, or delete knowledge from, a pre-trained target model without access to the original training dataset, which is currently impossible using conventional mechanisms. Some practical benefits of embodiments of the invention are that, if one device or party hosts a target model (e.g., trained using billions of proprietary training samples), another device or party can now "mimic" the behavior of that model without accessing or exposing the training data. Further, if a target model is trained to detect (e.g., thousands of) different categories of objects, to add a new category, conventional mechanisms require retraining the entire model from scratch. According to embodiments of the present invention, new knowledge can be incorporated by only defining the added data, while maintaining the stability of pre-existing knowledge using the random probe dataset. Such embodiments can be applied to fine tune pre-existing knowledge as well. For example, last year Google's deep learning model identified a black person as a "gorilla". Despite the outrage, there was no immediate solution, but to train the entire object recognition module from scratch, while adding more pictures of black people, which could take months. According to embodiments of the invention, the model can be post-trained using pictures of underrepresented classes of people, which can result in an immediate fix to the problem. The training dataset no longer requires the original billions of images, but only random or junk data (to stabilize the old input) and new data (to post-train the single class that needs to be improved). Post-training according to embodiments of the invention may take less time than conventional re-training because the training data is generated at random, so different training data may be used in each epoch, resulting in greater data diversity during training, which typically converges faster than reusing the same training samples in every epoch.

When used herein, a new model may mimic the behavior of a target model when, in response to inputting the same inputs, both models generate the same or approximately/substantially the same outputs for greater than a threshold proportion (e.g., majority or 50%, 75%, 90%, 99%, or any percentage therebetween) of input/output pairs.

Substantially, approximately, or similar may refer herein to a deviation from an exact measure of any threshold less than or equal to 10%.

In the foregoing description, various aspects of the present invention are described. For purposes of explanation, specific configurations and details are set forth in order to provide a thorough understanding of the present invention. However, it will also be apparent to persons of ordinary skill in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

The aforementioned flowchart and block diagrams illustrate the architecture, functionality, and operation of possible implementations of systems and methods according to various embodiments of the present invention. In this regard, each block in the flowchart or block diagrams may represent a module, segment, or portion of code, which may comprise one or more executable instructions for implementing the specified logical function(s). In some alternative implementations, the functions noted in the block may occur out of the order noted in the figures or by different modules. Unless explicitly stated, the method embodiments described herein are not constrained to a particular order or sequence. Additionally, some of the described method embodiments or elements thereof can occur or be performed at the same point in time. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Embodiments of the invention may include an article such as a non-transitory computer or processor readable medium, or a computer or processor non-transitory storage medium, such as for example a memory (e.g., memory units 206 or 220 of FIG. 2), a disk drive, or a USB flash memory, encoding, including or storing instructions, e.g., computer-executable instructions, which, when executed by a processor or controller (e.g., processor 204 or 218 of FIG. 2), carry out methods disclosed herein.

In the above description, an embodiment is an example or implementation of the inventions. The various appearances of "one embodiment," "an embodiment" or "some embodiments" do not necessarily all refer to the same embodiments. Although various features of the invention may be described in the context of a single embodiment, the features of embodiments may also be provided separately or in any suitable combination. Conversely, although the invention may be described herein in the context of separate embodiments for clarity, the invention may also be implemented in a single embodiment. Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

The descriptions, examples, methods and materials presented in the claims and the specification are not to be construed as limiting but rather as illustrative only. While certain features of the present invention have been illustrated and described herein, many modifications, substitutions, changes, and equivalents may occur to those of ordinary skill in the art. It is, therefore, to be understood that the appended claims are intended to cover all such modifications and changes as fall with the true spirit of the invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Different embodiments are disclosed herein. Features of certain embodiments may be combined with features of other embodiments; thus certain embodiments may be combinations of features of multiple embodiments.

The invention claimed is:

1. A method to mimic a pre-trained target model at a device without access to the pre-trained target model or its original training dataset, the method comprising, at the device:
    sending a set of random or semi-random input data to a remote device to randomly probe the pre-trained target model remotely by inputting the set of random or semi-random input data into the pre-trained target model;
    receiving from the remote device a set of corresponding output data generated by applying the pre-trained target model to the set of random or semi-random input data;
    generating a random probe training dataset comprising the set of random or semi-random input data and corresponding output data generated by randomly probing the pre-trained target model;
    training a new model with the random probe training dataset so that the new model generates substantially the same corresponding output data in response to said input data to mimic the pre-trained target model; and
    removing a desired correlation in the new model based on training data linking an input to an output, without accessing at least one of the input or output, by adding to the random probe training dataset a plurality of random correlations to the output or input, respectively, to weaken or eliminate the desired correlation in the new model between the input and output diluted by the plurality of random correlations.

2. The method of claim 1 comprising adding new data to the random probe training dataset to incorporate new knowledge not present in the pre-trained target model.

3. The method of claim 1 comprising defining data to be omitted from the random probe training dataset to eliminate a category or class present in the pre-trained target model.

4. The method of claim 1 comprising re-training the new model using the random probe training dataset to mimic re-training the target pre-trained model.

5. The method of claim 4 comprising sparsifying the new model to mimic the pre-trained target model to generate a sparse new model.

6. The method of claim 4 comprising evolving the new model by applying evolutionary algorithms to mimic the pre-trained target model.

7. The method of claim 1 comprising generating or re-training the new model after all copies of the original training dataset are deleted at the remote device.

8. The method of claim 1 comprising training the new model over multiple epochs with a different random probe training dataset in each of the multiple epochs.

9. The method of claim 1 comprising setting the structure of the new model to be simpler than the structure of the pre-trained target model.

10. The method of claim 1, wherein the models are neural networks, and comprising setting the new model to have a number of neurons, synapses, or layers, to be less than that of the pre-trained target model.

11. The method of claim 1, wherein the models are neural networks, and comprising generating synthetic training samples by backpropagating error at an output layer backwards through the target model neural network to adjust training samples in the input layer to reduce the error.

12. The method of claim 1, wherein the models are neural networks each comprising a plurality of layers, and comprising training the new model layer-by-layer in a plurality of sequential stages, each stage training a respective sequential layer of the new model neural network.

13. The method of claim 1 comprising measuring statistical properties of one or more sample inputs of the same type as the original training dataset or an accessible subset thereof; and semi-randomly selecting the set of input data according to those statistical properties.

14. The method of claim 1 comprising
    requesting the remote device perform an initial probe of the pre-trained target model with multiple input samples of each of a plurality of data types or distributions that vary according to gaussian or uniform distributions from each other in an input space; and
    selecting the data type or distribution for the random probe training dataset that has corresponding multiple target model outputs that have the smallest difference in the output space.

15. The method of claim 1 comprising, after training the new model, executing the new model in a run-time phase by inputting new data into the new model and generating corresponding data output by the new model.

16. A system for performing machine learning to generate a new model to mimic a pre-trained target model without obtaining the pre-trained target model or its original training dataset, the system comprising:
    one or more processors configured to:
        send a set of random or semi-random input data to a remote device to randomly probe the pre-trained target model remotely by inputting the set of random or semi-random input data into the pre-trained target model,
        receive from the remote device a set of corresponding output data generated by applying the pre-trained target model to the set of random or semi-random input data,
        generate a random probe training dataset comprising the set of random or semi-random input data and corresponding output data generated by randomly probing the pre-trained target model, train a new model with the random probe training dataset so that the new model generates substantially the same corresponding output data in response to said input data to mimic the pre-trained target model, and remove a desired correlation in the new model based on training data linking an input to an output, without accessing at least one of the input or output, by adding to the random probe training dataset a plurality of random correlations to the output or input, respectively, to weaken or eliminate the desired correlation in the new model between the input and output diluted by the plurality of random correlations.

17. The system of claim 16 comprising one or more memories to store one or more samples of the random probe training dataset.

18. The system of claim 17, wherein the one or more memories are temporary memories that store samples of the random probe training dataset on-the-fly and delete the samples on-the-fly after the samples are used to train the new model.

19. The system of claim 16, wherein the one or more processors are configured to add new data to the random probe training dataset to incorporate new knowledge not present in the pre-trained target model.

20. The system of claim 16, wherein the one or more processors are configured to define data to be omitted from the random probe training dataset to eliminate a category or class present in the pre-trained target model.

21. The system of claim 16, wherein the one or more processors are configured to re-train the new model using the random probe training dataset to mimic re-training the target pre-trained model.

22. The system of claim 16, wherein the one or more processors are configured to generate or re-train the new model after all copies of the original training dataset are deleted at the remote device.

23. The system of claim 16, wherein the one or more processors are configured to request the remote device perform an initial probe of the pre-trained target model with multiple input samples of each of a plurality of data types or distributions that vary according to gaussian or uniform distributions from each other in an input space; and select the data type or distribution for the random probe training dataset that has corresponding multiple target model outputs that have the smallest difference in the output space.

24. The system of claim 16, wherein the one or more processors are configured to train the new model over multiple epochs with a different random probe training dataset in each of the multiple epochs.

25. The system of claim 16, wherein the one or more processors are configured to set the structure of the new model to be simpler than the structure of the pre-trained target model.

26. The system of claim 16, wherein the models are neural networks, and the one or more processors are configured to set the new model to have a number of neurons, synapses, or layers, to be less than that of the pre-trained target model.

27. The system of claim 16, wherein the models are neural networks, and the one or more processors are configured to generate synthetic training samples by backpropagating error at an output layer backwards through the target model neural network to adjust training samples in the input layer to reduce the error.

28. The system of claim 16, wherein the models are neural networks each comprising a plurality of layers, and the one or more processors are configured to train the new model layer-by-layer in a plurality of sequential stages, each stage training a respective sequential layer of the new model neural network.

29. The system of claim 16, wherein the one or more processors are configured to, after training the new model, execute the new model in a run-time phase by inputting new data into the new model and generating corresponding data output by the new model.

30. A non-transitory computer-readable medium comprising instructions which, when implemented in one or more processors in a computing device, cause the one or more processors to mimic a pre-trained target model at a device without access to the pre-trained target model or its original training dataset by:

sending a set of random or semi-random input data to a remote device to randomly probe the pre-trained target model remotely by inputting the set of random or semi-random input data into the pre-trained target model;

receiving from the remote device a set of corresponding output data generated by applying the pre-trained target model to the set of random or semi-random input data;

generating a random probe training dataset comprising the set of random or semi-random input data and corresponding output data generated by randomly probing the pre-trained target model;

training a new model with the random probe training dataset so that the new model generates substantially the same corresponding output data in response to said input data to mimic the pre-trained target model; and removing a desired correlation in the new model based on training data linking an input to an output, without accessing at least one of the input or output, by adding to the random probe training dataset a plurality of random correlations to the output or input, respectively, to weaken or eliminate the desired correlation between the input and output diluted by the plurality of random correlations.

* * * * *